(12) United States Patent
Lee et al.

(10) Patent No.: US 11,531,360 B2
(45) Date of Patent: Dec. 20, 2022

(54) ELECTRONIC DEVICE AND METHOD FOR CONTROLLING THEREOF

(71) Applicant: Samsung Electronics Co., Ltd, Suwon-si (KR)

(72) Inventors: Nokhaeng Lee, Suwon-si (KR); Gyusung Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 601 days.

(21) Appl. No.: 16/577,959

(22) Filed: Sep. 20, 2019

(65) Prior Publication Data

US 2020/0097031 A1 Mar. 26, 2020

(30) Foreign Application Priority Data

Sep. 21, 2018 (KR) .................. 10-2018-0113430

(51) Int. Cl.
*G05B 19/042* (2006.01)
*G05D 19/02* (2006.01)
*H04R 1/08* (2006.01)
*G10L 25/51* (2013.01)
*H04R 1/02* (2006.01)
*H04R 3/00* (2006.01)
*G10L 25/18* (2013.01)

(52) U.S. Cl.
CPC ............ *G05D 19/02* (2013.01); *G05B 19/042* (2013.01); *G10L 25/18* (2013.01); *G10L 25/51* (2013.01); *H04R 1/025* (2013.01); *H04R 1/08* (2013.01); *H04R 3/00* (2013.01); *G05B 2219/25053* (2013.01)

(58) Field of Classification Search
CPC ......... G10L 25/51; G10L 25/18; H04R 1/025; H04R 3/00; H04R 1/08; H04R 1/028; H04R 2410/05; G05D 19/02; G05D 2105/48; G05B 2219/2633; G05B 2219/25033
USPC ....................................................... 700/280
See application file for complete search history.

(56) References Cited

U.S. PATENT DOCUMENTS

| 6,220,045 B1 | 4/2001 | Kim |
| 2008/0172805 A1 | 7/2008 | Na et al. |
| 2009/0002939 A1 | 1/2009 | Baugh et al. |

(Continued)

FOREIGN PATENT DOCUMENTS

| JP | 2012000353 A | * 1/2012 |
| JP | 2012000353 A | 1/2012 |

(Continued)

OTHER PUBLICATIONS

International Search Report dated Jan. 31, 2020 in connection with International Patent Application No. PCT/KR2019/012254, 3 pages.

(Continued)

*Primary Examiner* — Melur Ramakrishnaiah

(57) ABSTRACT

Provided is an electronic device. The electronic device includes a motor, a memory configured to store at least one of first frequency information associated with a sound that is generated when the motor is driven or second frequency information associated with a surrounding environment of the electronic device, and a processor configured to control the motor to be driven by avoiding a driving speed corresponding to the frequency information stored in the memory.

18 Claims, 19 Drawing Sheets

(56) References Cited

U.S. PATENT DOCUMENTS

| | | |
|---|---|---|
| 2014/0013842 A1 | 1/2014 | Holliday |
| 2014/0094973 A1* | 4/2014 | Giaimo, III ............... G06F 1/20 |
| | | 381/56 |
| 2015/0184324 A1 | 7/2015 | Mo |
| 2015/0300684 A1 | 10/2015 | Mehta et al. |

FOREIGN PATENT DOCUMENTS

| | | |
|---|---|---|
| JP | 4877339 B2 | 2/2012 |
| JP | 4941319 B2 | 5/2012 |
| KR | 1992-0006570 A | 4/1992 |
| KR | 10-2000-0034278 A | 6/2000 |
| KR | 10-2008-0070323 A | 7/2008 |
| KR | 10-1054431 B1 | 7/2011 |
| KR | 10-2015-0075626 A | 7/2015 |
| KR | 10-2017-0105382 A | 9/2017 |

OTHER PUBLICATIONS

Written Opinion of the International Searching Authority dated Jan. 31, 2020 in connection with International Patent Application No. PCT/KR2019/012254, 4 pages.

Supplementary European Search Report dated Jul. 29, 202, in connection with European Patent Application No. 19863684.7, 8 pages.

\* cited by examiner

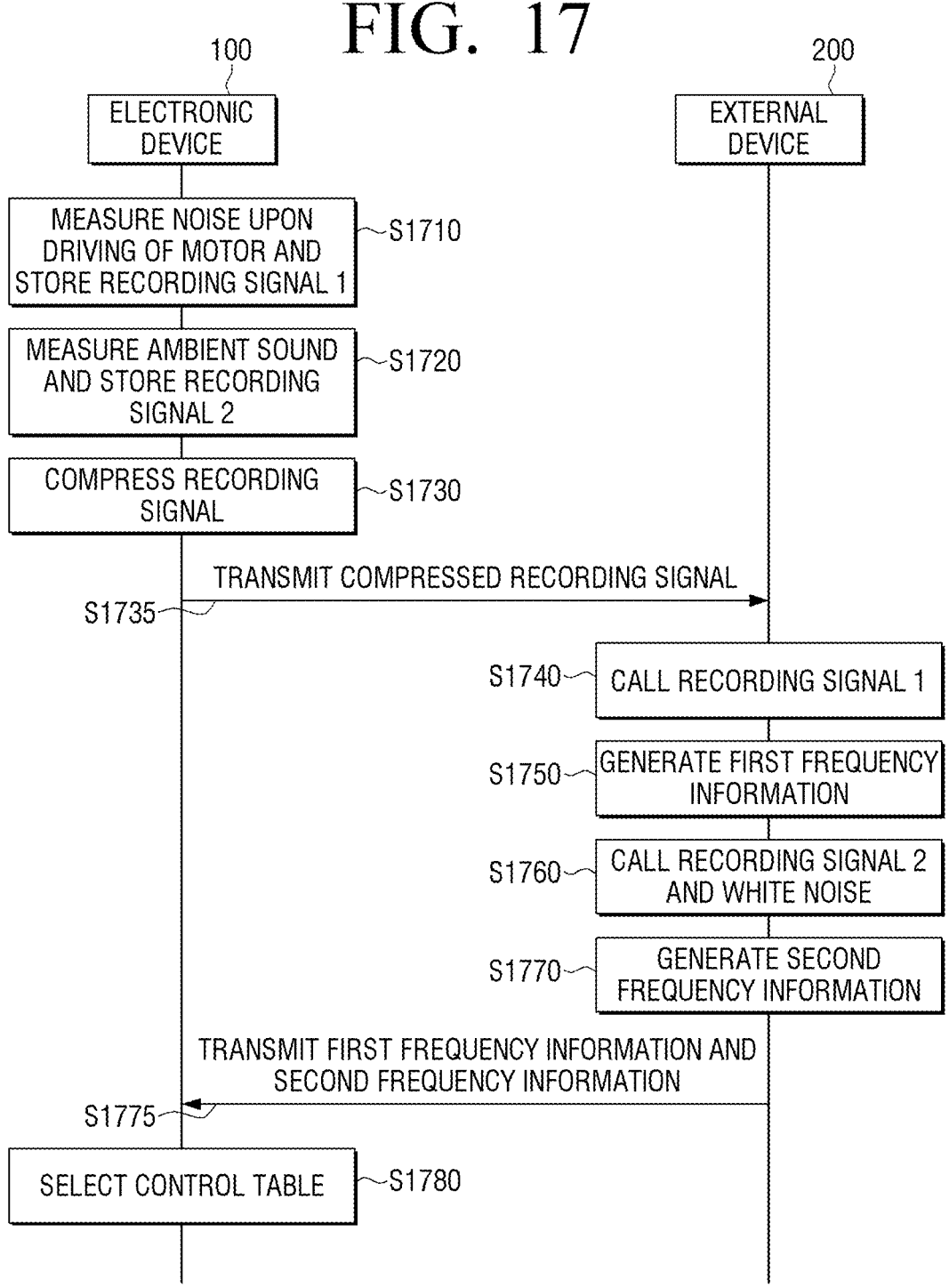

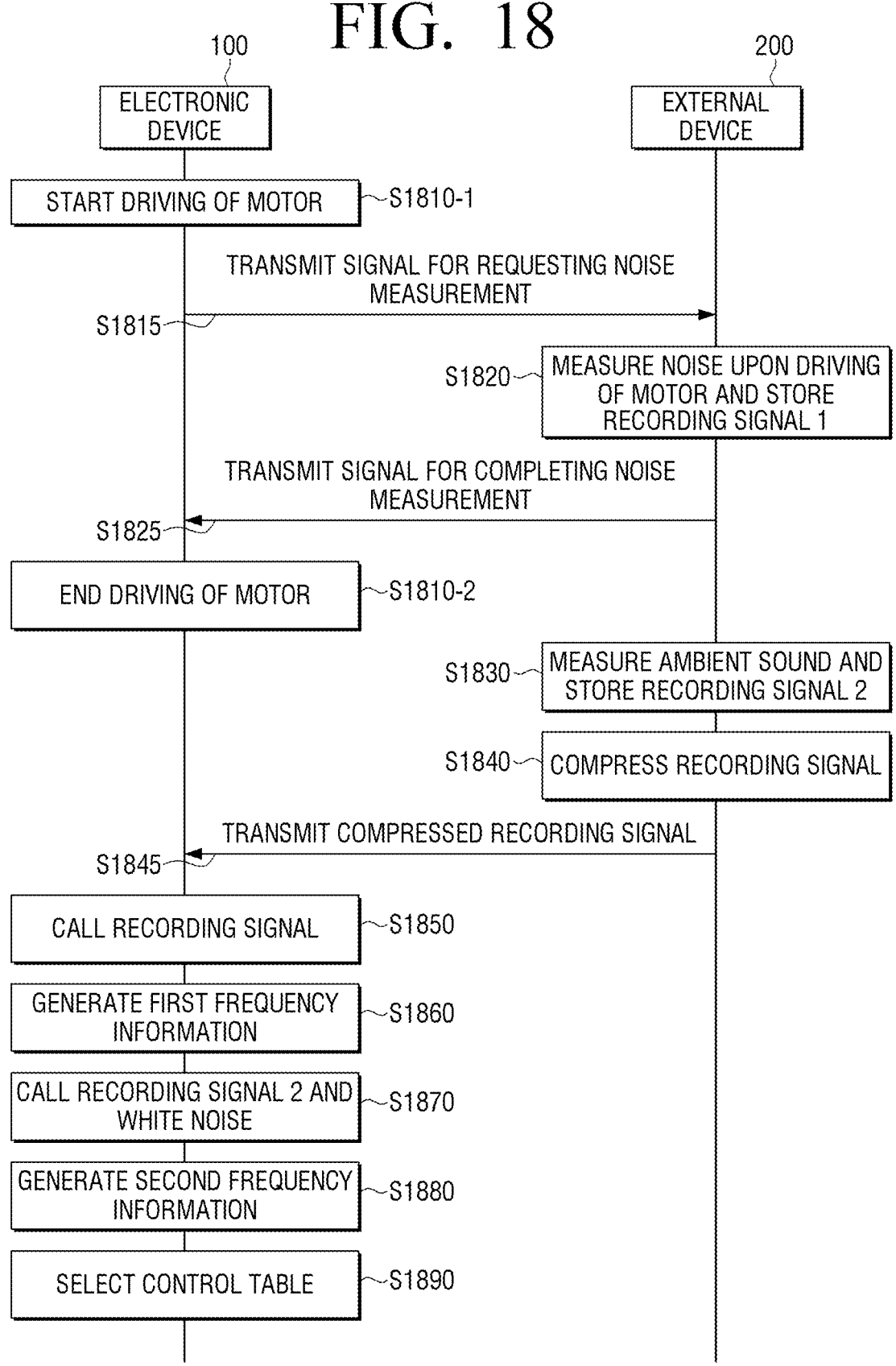

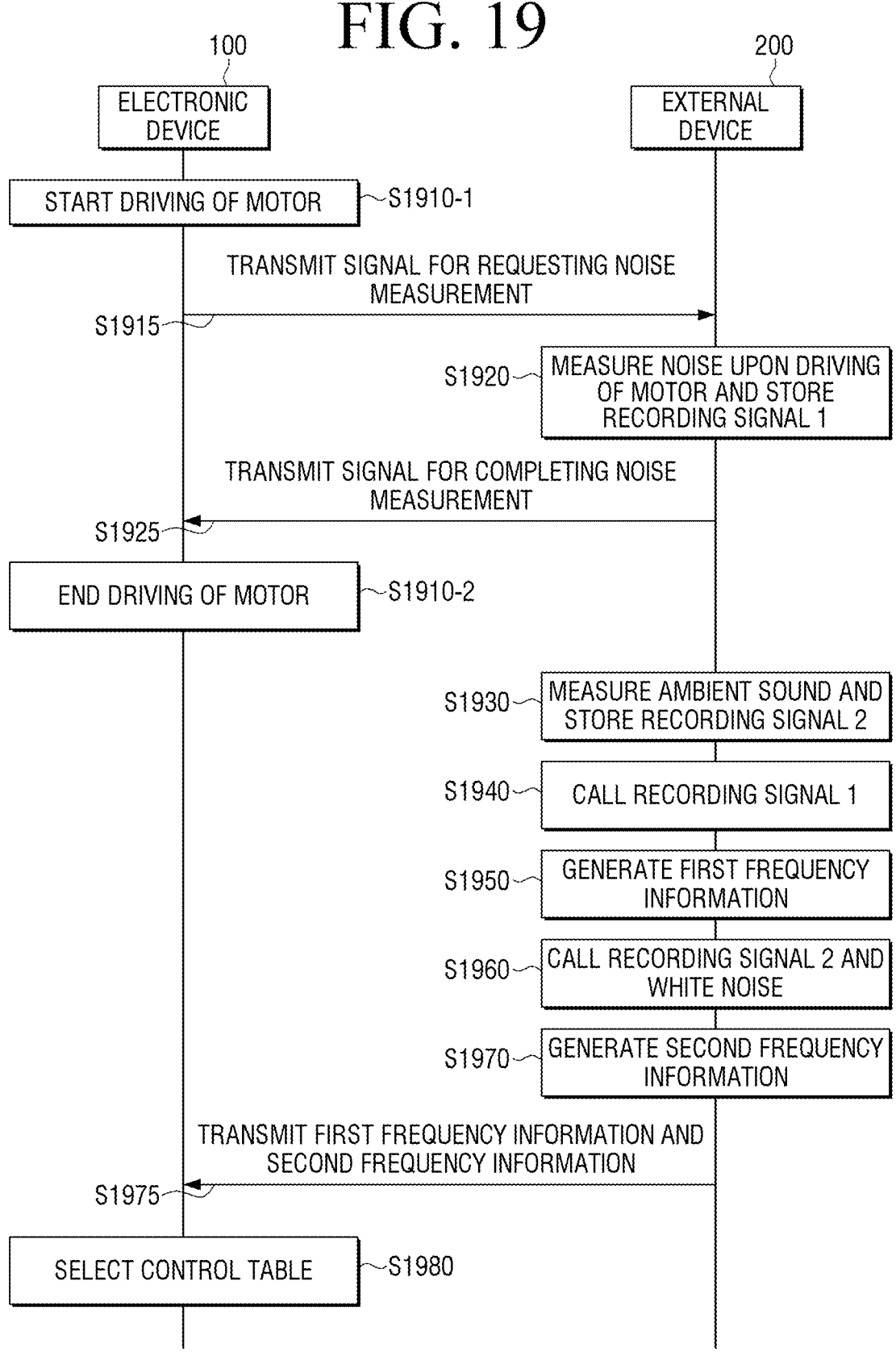

ELECTRONIC DEVICE AND METHOD FOR CONTROLLING THEREOF

CROSS-REFERENCE TO RELATED APPLICATION

This application is based on and claims priority under 35 U.S.C. § 119 to Korean Patent Application No. 10-2018-0113430 filed on Sep. 21, 2018 in the Korean Intellectual Property Office, the disclosure of which is incorporated by reference herein in its entirety.

BACKGROUND

1. Field

The disclosure relates to an electronic device and a controlling method thereof and, more particularly, to an electronic device which reduces vibration and noise by obtaining frequency information of the electronic device and surrounding environment, and controlling a motor to avoid frequency obtained by the base frequency corresponding to a speed of a motor, and a controlling method thereof.

2. Description of Related Art

Generally, an electronic device such as a refrigerator and a washing machine has a motor for performing certain functions. However, large vibration and noise may be caused in the process of driving the motor to perform the functions.

Recently, to reduce such vibration and noise, by using an accelerometer equipped in an electronic device, a method to measure the frequency associated with vibrations and noises that occur in the operation of the electronic device in advance, and design an electronic device to drive a motor by avoiding a speed corresponding to the measured frequency has been applied.

However, if the accelerometer is equipped inside rather than the outside of the electronic device, it is not possible to accurately measure the frequency associated with vibration and noise that occur according to the impact of various surrounding environments, including floor conditions where the electronic device is installed, and thus, it has been difficult to design a motor to be driven by avoiding the speed corresponding to the frequency associated with the environment in which the electronic device is installed.

SUMMARY

The objective of the disclosure is to provide an electronic device that reduces vibration and noise by obtaining frequency information of an electronic device and ambient environment, and controlling a motor to avoid frequency obtained by the base frequency corresponding to a motor speed, and a controlling method thereof.

According to an embodiment, an electronic device includes a motor, a memory configured to store at least one of first frequency information associated with a sound that is generated when the motor is driven and second frequency information associated with a surrounding environment of the electronic device, and a processor configured to control the motor to be driven by avoiding a driving speed corresponding to frequency information stored in the memory.

According to an embodiment, a controlling method of an electronic device including a motor may include storing at least one of first frequency information associated with a sound that is generated when the motor is driven and second frequency information associated with a surrounding environment of the electronic device, and driving the motor by avoiding a driving speed corresponding to the stored frequency information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 17 illustrates a sequence diagram to describe a method for selecting a control table using an external device according to a first embodiment;

FIG. 18 illustrates a sequence diagram to describe a method for selecting a control table using an external device according to a second embodiment; and FIG. 19 illustrates a sequence diagram to describe a method for selecting a control table using an external device according to a third embodiment.

DETAILED DESCRIPTION

Figure 1:
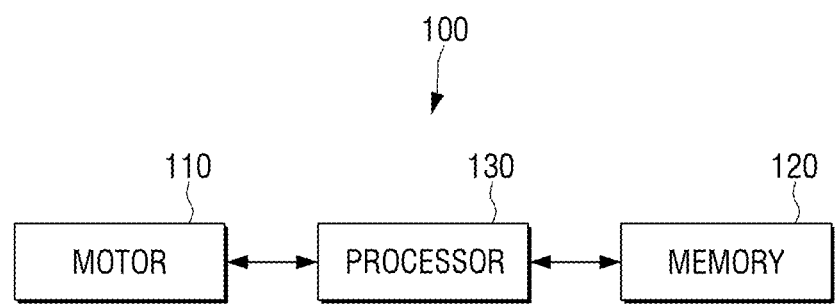
FIG. 1 illustrates a block diagram to illustrate a simple configuration of an electronic device according to an embodiment.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

After terms used in the specification are briefly described, the disclosure will be described in detail.

General terms that are currently widely used were selected as terms used in exemplary embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in exemplary embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by the terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure.

The disclosure will be described in greater detail with reference to the drawings.

FIG. 1 illustrates a block diagram to describe a simple configuration of an electronic device according to an embodiment.

Referring to FIG. 1, an electronic device 100 includes a motor 110, a memory 120, and a processor 130.

The electronic device 100 is a device which may generate vibration and noise due to driving of the motor 110 during a process to perform an intrinsic function. For example, the electronic device 100 may be a washing machine, a refrigerator, or a cleaner, but is not limited thereto.

The motor 110 which is disposed inside the electronic device 100 drives a configuration related to performing a function of the electronic device 100. For example, when the electronic device 100 is a washing machine, the motor 110 may rotate a drum receiving laundry at a high speed for dehydration. At this time, in a process where the motor 110 drives the drum, vibration and noise may be caused.

As a still another embodiment, when the electronic device 100 is a refrigerator, the motor 110 may drive a refrigerant compressor for generating a refrigerant. At this time, in a process where the motor 110 drives the refrigerant compressor, vibration and noise may be caused.

The memory 120 stores various data for overall operation of the electronic device 100, such as a program for processing or controlling of the processor 130. To be specific, the memory 120 may store a plurality of application programs driven in the electronic device 100, data and commands for operating the electronic device 100.

The memory 120 may be accessed by the processor 130 and reading/recording/modifying/updating, or the like of data may be performed by the processor 130. The memory 120 may be implemented not only as a storage medium inside the electronic device 100 but also as an external storage medium, a removable disk including a universal serial bus (USB) memory, a web server through network, or the like.

The memory 120 may store the frequency information for the sound generated in the driving of the electronic device 100 or the frequency information about the environment around the electronic device 100. Specifically, the memory 120 may store the frequency information received from an external device through the communication device 170 or the frequency information generated by the processor 130. A specific description of the frequency information stored in the memory 120 will be described below in connection with the operation of the processor 130.

The memory 120 may store a speed control table of the motor 110. The speed control table is a table having information on the driving speed according to time of the motor 110 in response to a specific function of the electronic device 100. In addition, the speed control table may also include information about driving speed according to frequency, and may include additional information.

For example, when the electronic device 100 is a washing machine, the memory 120 may store the speed control table having information on the driving speed over time of the motor 110, in response to the hydration function of the washing machine. When the electronic device 100 is a cleaner, the memory 120 may store the speed control table having information about the driving speed over time of the motor 110, in response to an absorption level set by a user.

The processor 130 performs control over each configuration in the electronic device 100. Specifically, the processor 130 may control the operation of a configuration related to performance of the function upon receiving a command for a particular function. For example, if the electronic device 100 is a washing machine, the processor 130 may control the operation of the motor 110 to provide a rotational force to the drum that receives laundry upon receiving the dehydration command.

The processor 130, using the frequency information stored in the memory 120, may control an operation of the motor 110. To be specific, the processor 130 may control the motor 110 to be driven by avoiding the driving speed corresponding to the frequency information stored in the memory 120.

More specifically, in response to a particular function of the electronic device 100, the processor 130 may control the motor 110 to be driven for some minutes for short or for several hours for long. At this time, when the base frequency corresponding to the driving speed of the motor 110 corresponds to a specific frequency, a resonance phenomenon may occur, making vibration and noise larger. Therefore, the processor 130 may control the motor 110 so that the base frequency corresponding to the motor speed may avoid a specific frequency, using information on the specific frequency which enlarges vibration and noise.

Here, the specific frequency may be various eigenfrequency (natural frequency) related to the electronic device 100. For example, the specific frequency may be resonance frequencies of the electronic device 100 when the motor 110 is driven. If the processor 130 drives the motor 110 with the speed corresponding to the eigenfrequency of the electronic device 100, vibration and noise may be increased due to the resonance phenomenon.

The eigenfrequency of the electronic device 100 upon driving the motor 110 may be different depending on the characteristics of the place where the electronic device 100 is installed. For example, if the electronic device 100 is installed on a hard floor, the measured eigenfrequency of the electronic device 100 upon driving of the motor 110 and the measured eigenfrequency of the electronic device 100 upon driving of the motor 110 when the electronic device 100 is installed in a soft floor may be different from each other.

When driving the motor 110 which reflected the characteristics of a place where the electronic device 100 is installed, if the eigenfrequency information of the electronic device 100 is used, the driving speed of the motor 110 may be controlled by a method that is suitable for each installation environment, and vibration and noise may be reduced.

As another example of the eigenfrequency associated with the electronic device 100, the eigenfrequency of the surrounding environment of the electronic device 100 may correspond thereto. Specifically, the eigenfrequency of the surrounding environment means the eigenfrequency of the surrounding environment of the electronic device 100, including the room in which the electronic device 100 is installed and goods located inside the room, or the like. If the processor 130 operates the motor 110 at a speed corresponding to the eigenfrequency of the surrounding environment, the vibration and noise may be increased due to the resonance phenomenon.

At this time, the eigenfrequencies of the surrounding environment may be different from each other due to an impact of the height of a room, size of the room, the size of the disposed object, position of the object, or the like. Therefore, the processor 130 may control the driving speed of the motor 110 in a way suitable to each surrounding environment by using the eigenfrequency information of the surrounding environment of the electronic device 100, and reduce the vibration and noise.

When driving the motor 110 as described above, the eigenfrequency of the electronic device 100 may be obtained from the information on the ambient sound of the electronic device 100 that is measured during the driving of the motor 110. In contrast, the eigenfrequency of the surrounding environment may be obtained from the information of the ambient sound of the electronic device 100 which is measured when the motor 110 is not driven.

A specific description of obtaining the eigenfrequency from the information for measuring the ambient sound of the electronic device 100 will be described with reference to FIGS. 3 and 4.

The processor 130 may control the motor 110 so that not only the base frequency corresponding to the motor speed but also the harmonics of the base frequency may avoid the aforementioned eigenfrequency. This is because the resonance phenomenon may occur even when the processor 130 operates the motor 110 at the speed corresponding to the base frequency having the harmonics that is the same frequency as the eigenfrequency, and vibration and noise may be increased.

A specific method of controlling the motor 110 by the processor 130 so that the driving speed corresponding to the base frequency having the same frequency as the aforementioned eigenfrequency or base frequency having the harmonics which is the same frequency as the eigenfrequency may be avoided will be described with reference to FIG. 5.

The processor 130 may update the speed control table of the motor 110 prestored in the memory 120 so as to avoid the driving speed corresponding to the base frequency having the same frequency as the aforementioned eigenfrequency or the base frequency having harmonics which is the same frequency as the eigenfrequency.

For example, the prestored speed control table of the motor 110 may be a speed control table that is set as a default at the time of initial manufacturing of the electronic device 100. When the electronic device 100 is installed, the processor 130 may obtain the eigenfrequency of the electronic device 100 and the eigenfrequency of the surrounding environment, when the motor 110 reflecting the impact of the installation environment is driven. The processor 130 may update the speed control table of the motor 110 to avoid the driving speed corresponding to the base frequency having the same frequency as the obtained eigenfrequency or the base frequency having harmonics which is the same frequency as the eigenfrequency.

A specific description of updating the speed control table of the motor 110 will be described later with reference to FIG. 5.

When a plurality of speed control tables of the motor 110 corresponding to the base frequency having the same frequency as each eigenfrequency or the base frequency having harmonics which is the same frequency as the eigenfrequency is stored, the processor 130 may select a suitable speed control table using the eigenfrequency of the electronic device 100 or information on the eigenfrequency of the surrounding environment.

For example, upon driving the motor 110, when the eigenfrequency of the electronic device 100 is 17 Hz, the processor 130 may select the speed control table which may avoid the driving speed corresponding to the 17 Hz, among a plurality of speed control tables.

When a preset event occurs, the processor 130 may update the speed control table stored in the memory 120. Here, the preset event may be an event in which the electronic device 100 is installed first, an event to reach a preset cycle, or an event to receive an update command from a user, or the like.

When a separate sensor (not shown) which is capable of identifying that a surrounding environment has been changed is provided in the electronic device 100, the processor 130 may update the speed control table at the time when the change of the surrounding environment is sensed through a sensor. In the meantime, the preset event is not limited thereto.

The processor 130 may control the motor 110 using an updated speed control table. Alternatively, the processor 130 may control the motor 110 using the selected speed control table among a plurality of speed control tables.

In illustrating and describing FIG. 1, it has been illustrated and described that only one motor 110 is provided, but in implementation, the electronic device 100 may include a plurality of motors.

In illustrating and describing FIG. 1, it has been described that the memory 120 stores frequency information or the speed control table, but in implementation, the frequency information or the speed control table may be stored in the processor 130.

It has been described a simple configuration of the electronic device, but in implementation, various configurations may be added. This will be described below with reference to FIG. 2.

Figure 2:
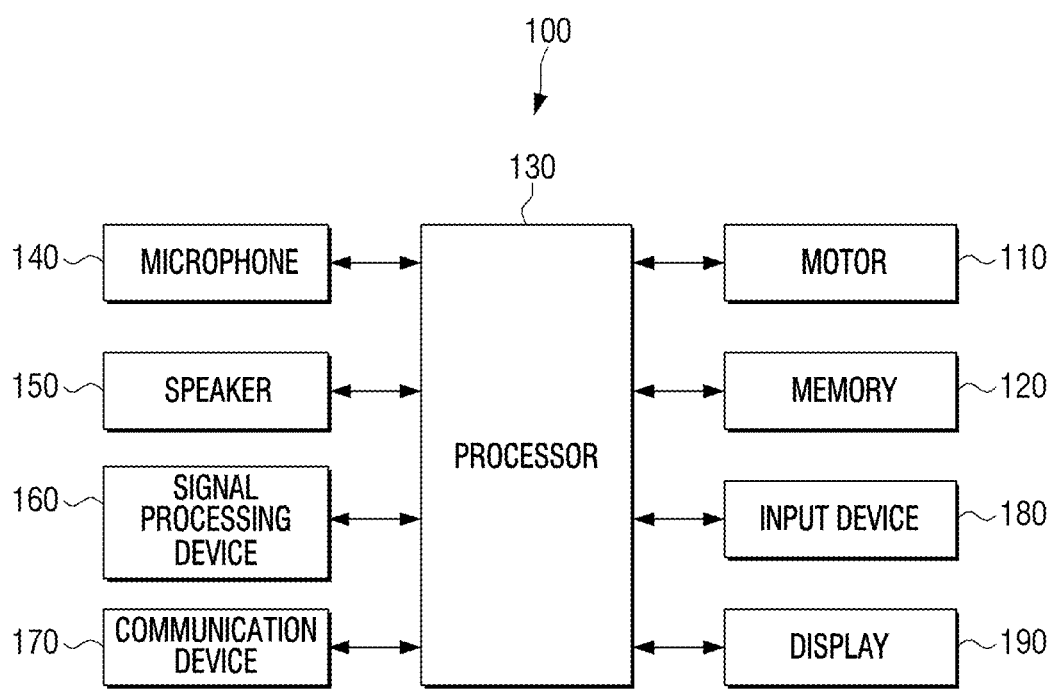
FIG. 2 illustrates a block diagram to illustrate a specific configuration of an electronic device according to an embodiment.

FIG. 2 is a block diagram illustrating a specific configuration of the electronic device according to an embodiment.

Referring to FIG. 2, the electronic device 100 according to an embodiment may include the motor 110, the memory 120, the processor 130, a microphone 140, a speaker 150, a signal processing device 160, a communication device 170, an input device 180, and a display 190.

The motor 110, the memory 120, and the processor 130 perform the same function as FIG. 1, and the redundant description will be omitted.

The microphone 140 may be provided in the electronic device 100 and measure the ambient sound of the electronic device 100. For example, when the electronic device 100 performs an operation corresponding to a specific function, the sound which is generated in the electronic device 100 when performing the function may be measured. In addition, when the electronic device 100 is not operating, the sound generated from the surrounding environment of the electronic device 100 may be measured.

The microphone 140 may transform information on the ambient sound measured by the electronic device 100 into an electrical signal, and transmit the transformed signal to the signal processing device 160.

The speaker 150 may be provided inside the electronic device 100 and output sound to the outside of the electronic device 100. To be specific, the speaker 150 may transform a preset electrical signal to sound according to the control of the processor 130 and output the sound.

The microphone 140 may measure the ambient sound of the electronic device 100 during the output of the speaker 150 and transform the sound into the electrical signal, and transmit the signal to the signal processing device 160.

The signal processing device 160 may obtain the eigenfrequency information related to the electronic device 100 using the sound information that is measured by the microphone 140 and the sound information that is output from the speaker 150.

To be specific, the microphone 140 may measure the sound that is generated upon driving of the motor 110, convert the sound into an electrical signal, and then transmit the signal to the signal processing device 160, and the signal processing device 160 may obtain the eigenfrequency information of the electronic device 10 using the transmitted electrical signal.

The speaker 150 may output a preset sound according to the control of the processor 130, the microphone 140 may measure the ambient sound of the electronic device 100 while the speaker 150 is outputting a sound and transform the sound into an electrical signal, and then transmit the signal to the signal processing device 160. At this time, the signal processing device 160 may obtain eigenfrequency information of the ambient environment using the transmitted electrical signal.

A specific description about that the signal processing device 160 obtains the frequency information related to the electronic device 100 using the transmitted electrical signal will be described with reference to FIGS. 3 and 4.

The communication device 170 is connected to an external device (not shown), and may transmit and receive various data from the external device. To be specific, the communication device 170 may be connected to an external device not only through a local area network (LAN) and the Internet but also through a universal serial bus (USB) port or a wireless communication (for example, WiFi 802.11a/b/g/n, near field communication (NFC), Bluetooth) port is also possible. Here, the external device may be a PC, a notebook, a smartphone, a server, or the like.

The communication device 170 may receive information on the ambient sound of the electronic device 100 measured by the external device.

To be specific, the communication device 170 may receive the ambient sound information of the electronic device 100 measured by the external device, when the motor 110 does not operate. The communication device 170 may receive the ambient sound information of the electronic device 100 measured by the external device, when the motor 110 operates.

The communication device 170 may transmit the ambient sound information measured by the microphone 140 to an external device. The communication device 170 may receive, from the external device, the frequency information obtained by using the ambient sound information received by the external device.

The detailed description of the communication device 170 to transceive sound information or frequency information through communication with an external device will be described with reference to FIGS. 6 to 8.

The communication device 170 may receive the speed control table through the communication with the external device. For example, the communication device 170 may transmit the frequency information to the external device, and receive the speed control table corresponding to the frequency information transmitted from the external device. The external device may be a server, or the like.

The input device 180 may include a plurality of function keys with which a user may set or select various functions available in the electronic device 100. Through this, the user may input various driving commands for the electronic device 100. For example, if the electronic device 100 is a washing machine, the user may input the dehydration command of the washing machine through the input device 180.

The display 190 may display various information provided by the electronic device 100. To be specific, the display 190 may display an operation state of the electronic device 100 or display a user interface window for selecting a function or option selected by the user.

For example, when the electronic device 100 is a washing machine, the display 190 may display that the washing machine is performing the dehydration operation, or may display the interface window so that the user may select for how many minutes the user will perform the dehydration function.

In illustrating and describing FIG. 2, it has been illustrated and described that the microphone 140 and the speaker 150 are provided in the electronic device 100, but in implementation, the microphone 140 or the speaker 150 may be provided separately from the electronic device.

In illustrating and describing FIG. 2, it has been described that the signal processing device 160 obtains frequency information related to the electronic device 100 using sound information measured by the microphone 140 and the sound information that is output from the speaker 150, but in implementation, the processor 130 may perform an operation of the signal processing device 160 described above.

In the related art, eigenfrequency of an electronic device is obtained using an accelerometer, and the electronic device is controlled to operate by avoiding the obtained frequency. However, there is a problem in that the eigenfrequency of the electronic device is obtained using the accelerometer prior to the launching of a product, but, after a user installs the electronic device, it is difficult to obtain the eigenfrequency information of the electronic device to which impact of the space in which the electronic device is installed is reflected.

In addition, even when the accelerometer is installed on an electronic device, the eigenfrequency of the surrounding environment in which the electronic device is installed could not be obtained by merely using the accelerometer. Thus, there is a problem that it is difficult for an electronic device to operate by avoiding the eigenfrequency of the surrounding environment.

In the meantime, as described above, the electronic device according to the embodiment may obtain frequency information related to the electronic device using a microphone and a speaker. To be specific, the electronic device may acquire the eigenfrequency information of the electronic device and the eigenfrequency information of the surrounding environment according to the influence of the place where the electronic device is installed. Therefore, since the electronic device may operate by avoiding the eigenfrequency of the electronic device reflecting the influence of the environment where the electronic device is installed and the eigenfrequency of the surrounding environment, vibration and noise may be reduced.

As voice recognition technology has been developed recently, it is common that a microphone and a speaker are basically provided in an electronic device, and the microphone and speaker are cheaper than an accelerometer, and thus the electronic device according to the embodiment has a cost-effective advantage over the related art.

Figure 3:
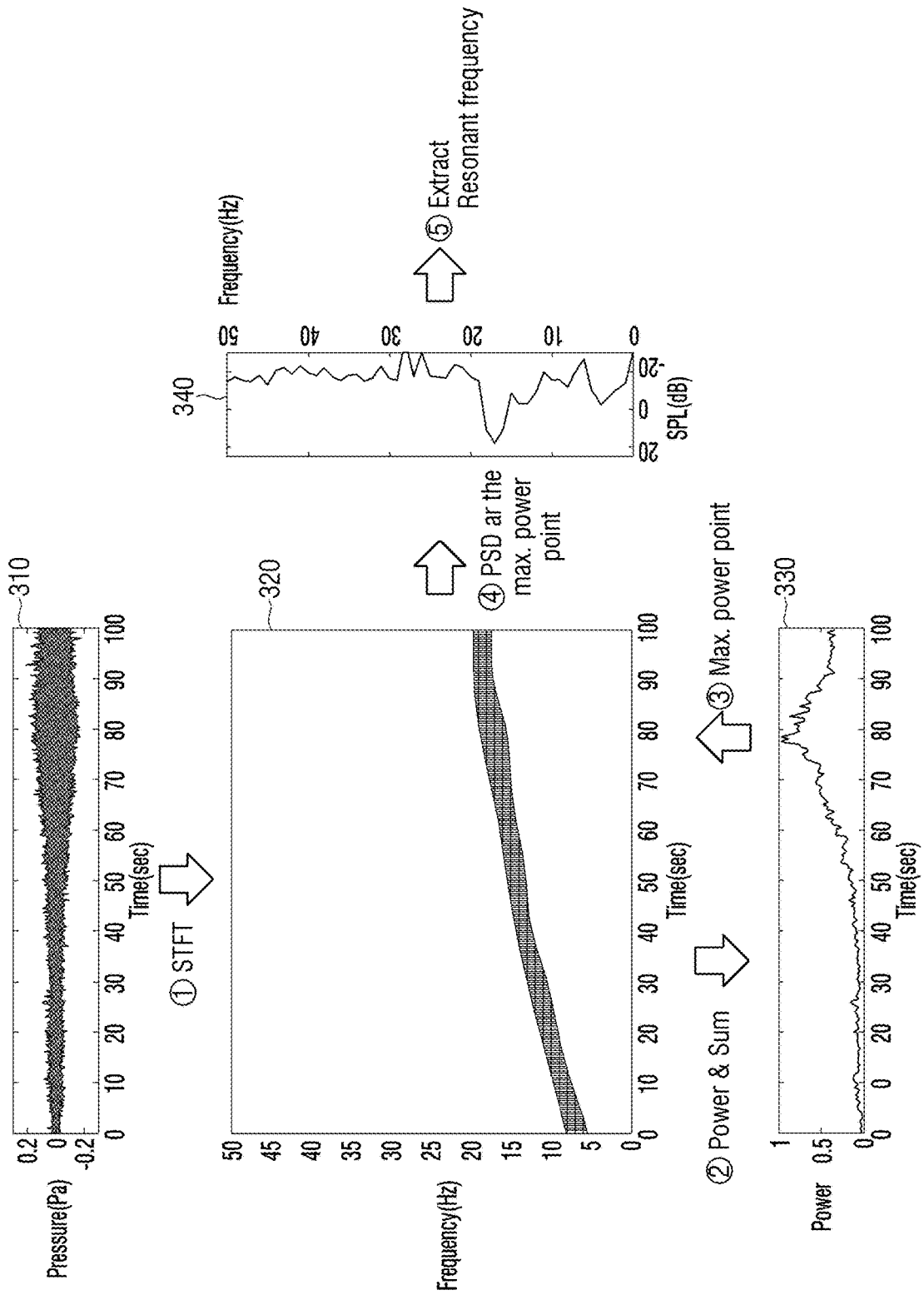
FIG. 3 illustrates a view to describe an operation to obtain frequency information using a microphone.

FIG. 3 illustrates a view to describe an operation to obtain frequency information using a microphone.

Referring to FIG. 3, the electronic device 100 according to an embodiment may acquire eigenfrequency information of the electronic device 10 using the microphone 140.

The processor 130 may control the motor 110 to be driven at a predetermined speed range. At this time, the microphone 140 may measure a sound which is generated when the motor 110 is driven, and by using the measured information, may generate a sound pressure (Pa) change graph 310 over time.

Here, the predetermined speed range is a speed range when the motor 110 is driven in response to a preset function of the electronic device 100. For example, if the electronic device 100 is a washing machine and the predetermined function is a dehydration function, the predetermined speed range is a speed range that includes the maximum speed of the motor that provides sufficient rotational force to the drum to perform dehydration from the speed in the stopped state.

The sound pressure (Pa) change graph 310 according to time is a graph that is generated by measuring the sound pressure in a predetermined time interval by the microphone 140. At this time, the predetermined time interval may be 1/Fs seconds (that is, Fs Hz).

Here Fs means the sampling frequency. The sampling frequency may be set to an appropriate value to increase the accuracy of the measurement result. For example, when an eigenfrequency of the electronic device 100 is to be measured if the motor 110 is driven, the frequency may be set to two or four times the expected eigenfrequency. In addition, the method for setting the sampling frequency is not limited to the above-mentioned example.

The sound pressure (Pa) change graph 310 over time may be applied with an anti-aliasing filter which filters an unnecessary signal as another way to improve accuracy of the measured result.

The sound pressure (Pa) change graph 310 according to time may be transmitted to the signal processing device 160, and the signal processing device 160 may perform transformation to a frequency domain using the transmitted graph 310.

To be specific, the signal processing device 160 may calculate a time-specific frequency spectrum 320 by performing a short time Fourier transform (STFT) on the received graph 310. In the time-specific frequency spectrum 320, the X-axis means time (Sec), the Y-axis means frequency band (Hz), and a column corresponding to the specific value (A) of the X-axis and the specific value (B) of the Y-axis means the power (dB) of the corresponding frequency band (B Hz) of the corresponding time (A sec).

In the disclosure, for convenient description, only a region having power (dB) which is greater than or equal to a predetermined size is illustrated in the drawings. Referring to FIG. 3, the columns formed in the frequency band about 5 Hz to 20 Hz correspond thereto.

The example of the frequency spectrum over time is not limited thereto. The frequency spectrum by time 320 may be adjusted to improve accuracy, and the detailed description will be described later with respect to FIGS. 9 to 14.

In addition, the signal processing device 160 may calculate the time-specific power change graph 330 from the frequency spectrum 320. In this case, the power may be calculated by adding up the squares of the absolute values of the respective frequency components for each time in the frequency spectrum 320. In addition, the power may be calculated using a root mean square (rms) of sound pressure by the time. The method of calculating the time-specific power change graph 330 is not limited to the above-described method.

The signal processing device 160 may identify the time having the maximum power from the time-specific power change graph 330. Referring to FIG. 3, it can be identified that the time having the maximum power is about 78 seconds, in this embodiment.

Here, the time with the maximum power may correspond to the time when the electronic device 100 operates with the loudest noise. Therefore, when the signal processing device 160 obtains the eigenfrequency information of the electronic device 100 by using the information related to the time with the maximum power, the processor 130 may control the motor to avoid vibration and noise by using the obtained information.

The signal processing device 160 may calculate a power spectrum density (PSD) graph 340 at the time with the maximum power using the information about time with the maximum power and time-specific frequency spectrum 320.

In addition, the signal processing device 160 may identify a frequency band having a maximum sound pressure level (SPL) from the power spectrum density graph 340. Referring to FIG. 3, it may be identified in this embodiment that the frequency band having the maximum sound pressure level is about 17 Hz.

Here, the frequency band having the maximum sound pressure level corresponds to the eigenfrequency of the electronic device 100. In addition, the signal processing device 160 may provide the processor 130 with the acquired information about the eigenfrequency of the electronic device 100, and control the motor to operate by avoiding the eigenfrequency of the electronic device 100.

The processor 130 may check whether the environment in which the electronic device 100 is abnormal from the eigenfrequency of the electronic device 100 obtained from the signal processing device 160. Specifically, the processor 130 checks whether the acquired eigenfrequency of the electronic device 100 is out of a preset range, and if the eigenfrequency is out of the preset range, it may be determined that the environment in which the electronic device 100 is installed has a problem.

Here, the preset range means the range of the eigenfrequency of the case where the electronic device 100 is installed normally, and the range may be determined according to a repetitive experiment result.

For example, when the electronic device 100 is installed on a bumpy floor, one of a plurality of legs supporting the main body of the electronic device 100 may be located on a hollow ground and is not in contact with the floor, thus floating in the air, or the electronic device 100 may be inclined to one side.

When the above-described eigenfrequency acquisition operation is performed in this state, as the plurality of legs of the electronic device 100 do not properly support the main body, the obtained eigenfrequency may be out of the range of the eigenfrequency of the case where the electronic device 100 is normally installed. Accordingly, the processor 130 may identify whether the electronic device 100 is installed in an abnormal state depending on whether the eigenfrequency is out of a preset range.

When the obtained eigenfrequency of the electronic device 100 is out of the preset range, the processor 130 may display a guide message regarding the installment environment of the electronic device 100 through the display 190.

For example, the processor 130 may display a guide message to request checking of the installation environment of the electronic device 100 to a user through the display 190 or a guide message to request so that the height of the legs to support the main body of the electronic device 100 is to be adjusted, or the like. A method of displaying a guide message for the installation environment of the electronic device 100 by the processor 130 is not limited to the above-described example.

In illustrating and describing FIG. 3, it has been described that the signal processing device obtains the frequency information using the STFT, but the method of obtaining the frequency information is not limited to the above example.

In describing FIG. 3, it has been described that the signal processing device receives the sound pressure change graph and obtains the eigenfrequency of the electronic device therefrom, but in implementation, it can be implemented such that the processor performs an operation of the above-described signal processing device.

Figure 4:
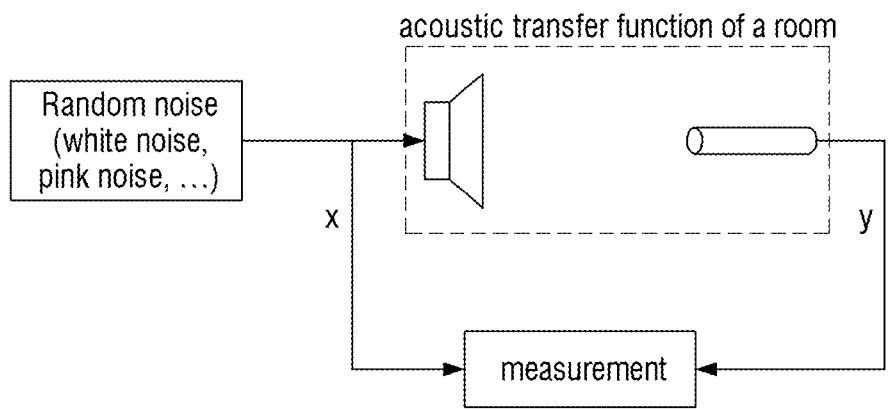
FIG. 4 illustrates a view to describe an operation to obtain frequency information using a speaker and a microphone.

FIG. 4 is a view to describe an operation to obtain frequency information using a speaker and a microphone.

Referring to FIG. 4, the electronic device 100 according to an embodiment may obtain the eigenfrequency information of the surrounding environment using the microphone 140 and the speaker 150.

First, the speaker 150 may output a preset sound under the control of the processor 130 when the motor is not driven. The preset sound is a sound of an electrical signal including the entire frequency band. For example, the sound may be the sound of at least one of an impulse signal, white noise, pink noise, a maximum length sequence (MLS) signal, or a chirp signal, but is not limited thereto.

While the speaker 150 outputs a preset sound including the full frequency band, the microphone 140 may measure the ambient sound of the electronic device 100. Specifically, the microphone 140 may measure not only the sound which is output from the speaker 150 and directly reaches the microphone 140 but also the sound reflected from the environment surrounding the electronic device 100 after being output from the speaker 150.

By comparing the sound information measured by the microphone 140 and the signal information output by the speaker 150, the signal processing device 160 may obtain the eigenfrequency information of the surrounding environment.

Specifically, the signal processing device 160 may transform the sound information measured by the microphone 140 and the signal information output by the speaker 150 into the frequency domain. If the frequency transform information of the measured sound information is Y and the frequency transform information of the output sound information is X, the signal processing device 160 may calculate a transfer function corresponding to Y/X.

The signal processing device 160 may identify the frequency of the band which forms the peak from the calculated transfer function. Here, the band which forms the peak corresponds to the eigenfrequency of the surrounding environment of the electronic device 100.

As the signal processing device 160 provides information on the obtained eigenfrequency of the surrounding environment to the processor 130, the processor 130 may control the motor to operate by avoiding the eigenfrequency of the surrounding environment.

In illustrating and describing FIG. 4, it has been illustrated and described that the signal processing device obtains the frequency information using the transfer function, but the method for obtaining the frequency information is not limited to the above-described example.

In addition, in describing FIG. 4, it has been described that the signal processing device obtains the eigenfrequency of the surrounding environment by using the sound measured from the surrounding environment, but it can also be implemented that the processor performs an operation of the signal processing device.

Figure 5:
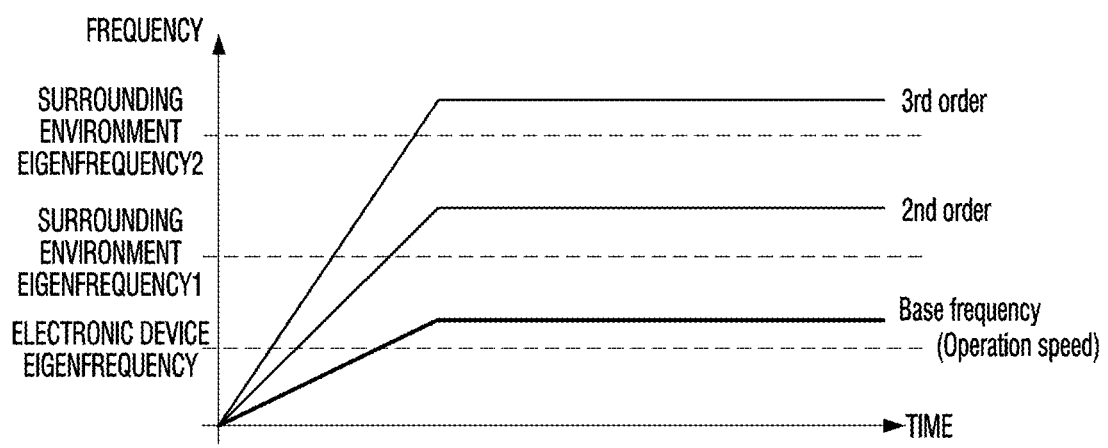
FIG. 5 illustrates a view of an example of a speed control table of a motor.

FIG. 5 is a view illustrating an example of a speed control table of a motor.

Referring to FIG. 5, a frequency graph corresponding to the driving speed of the motor 110 over time is identified. To be specific, a graph including the frequency information which is referred to by the processor 130 when controlling the driving speed of the motor 110 in response to the set function may be identified.

First, the eigenfrequency of the electronic device on the graph and the eigenfrequency of the surrounding environment may correspond to the eigenfrequency of the electronic device 100 which is obtained using the above-described microphone and speaker, when the motor 110 is driven, and the eigenfrequency of the surrounding environment. Alternatively, the eigenfrequency is the eigenfrequency of the electronic device 100 and the eigenfrequency of the surrounding environment upon driving of the motor 110, which is obtained using an external device to be described in FIGS. 6 and 7.

The base frequency on the graph is the frequency information which the processor 130 refers to for controlling the operation speed of the motor 110 in response to a preset function of the electronic device 100.

Here, the base frequency is set to be formed in a range that avoids the eigenfrequency of the electronic device 100 and the eigenfrequency of the surrounding environment. Specifically, the base frequency and the harmonics of the base frequency may be formed in a frequency band range other than the above-described eigenfrequency, or may be set to minimize the time formed in the frequency band range of the above-described eigenfrequency.

Accordingly, the processor 130 may, using the base frequency information, control the motor 110 to operate at a driving speed other than the speed range corresponding to the eigenfrequency described above, or control the motor 110 to minimize the driving time at the speed range corresponding to the eigenfrequency, and accordingly, vibration and noise may be reduced.

For example, upon driving of the motor 110, the processor 130 may control the motor 110 to be driven at the speed which is slower or faster than the driving speed corresponding to the eigenfrequency of the electronic device 100 or the eigenfrequency of the surrounding environment by the predetermined size.

As another example, upon driving of the motor 110, the processor 130 may control the motor 110 so that the motor 110 rapidly passes the operating time at the driving speed corresponding to the eigenfrequency of the electronic device 100 or the eigenfrequency of the surrounding environment.

The frequency graph corresponding to the driving speed of the motor 110 according to the time described above may be a graph set as a default when the electronic device 100 is initially manufactured and stored in the memory 120. In this case, the processor 130 may update the frequency graph by using the eigenfrequency of the electronic device 100 and the eigenfrequency of the surrounding environment when driving the motor 110 measured by the microphone 140 and the speaker 150 or obtained using an external device.

Alternatively, the frequency graph corresponding to the driving speed of the motor 110 according to the time described above may be generated as a plurality of graphs according to a combination of expected eigenfrequency of the electronic device 100 and eigenfrequency of the surrounding environment, and stored in the memory 120. In this case, the processor 130 may select a suitable frequency graph by using the eigenfrequency of the electronic device 100 and the eigenfrequency of the surrounding environment when driving the motor 110 measured by the microphone 140 and the speaker 150 or obtained using an external device.

Figure 6:
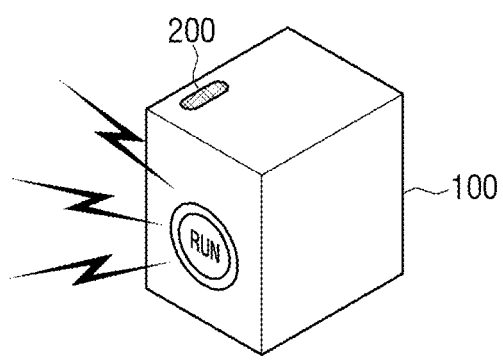
FIG. 6 and FIG. 7 illustrate views to describe an operation to obtain sound information using an external device.
Figure 7:
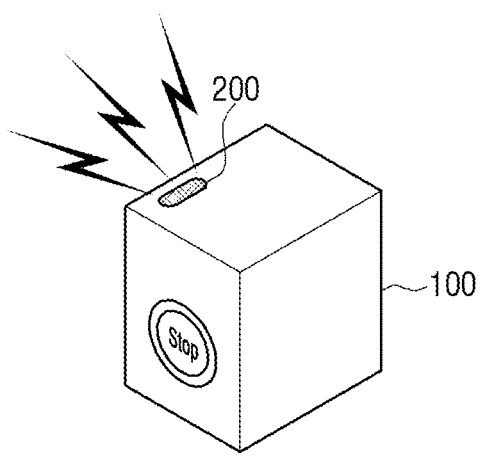

FIG. 6 and FIG. 7 are views to describe an operation to obtain sound information using an external device.

Referring to FIG. 6, the electronic device 100 according to an embodiment may measure the sound generated in the electronic device 100 upon driving of the motor 110, by using the external device 200.

Here, the external device 200 may be equipped with a microphone therein to measure the ambient sound of the external device 200. The external device 200 may be a PC, a notebook, a smartphone, or the like. For convenient description, it is assumed that the external device 200 is a smartphone and the electronic device 100 is a washing machine in one embodiment of the disclosure.

The external device 200 may measure a sound generated upon driving of the motor 110 of the electronic device 100 by using a microphone in a state where the external device 200 is located in the vicinity of the electronic device 100. For example, the sound generated upon driving of the motor of the washing machine may be generated using the microphone of the smartphone while the smartphone is placed on the washing machine.

To be specific, the external device 200 may measure the sound using the microphone while sharing information on the sound measurement time through communication with the electronic device 100.

For example, when the electronic device 100 starts driving of the motor 110, and transmits a request for starting the measurement, the external device 200 may start sound measurement, and when the electronic device 100 ends driving of the motor 110, and transmits a request for ending the measurement, the external device 200 may complete the sound measurement.

As still another embodiment, when the external device 20 transmits a measurement start signal, the electronic device 100 may start driving of the motor 110, and when the external device 200 transmits a measurement completion signal, the electronic device 100 may end the driving of the motor 110.

As another example, when the electronic device 100 transmits a measurement start request while starting the driving of the motor 110, the external device 200 starts sound measurement, and when the external device 200 transmits a measurement completion signal, the electronic device 100 may terminate the driving of the motor 110.

As still another example, when the external device 200 transmits a measurement start signal, the electronic device 100 may start driving the motor 110, and while the electronic device 100 ends the driving of the motor 110, and transmits the measurement completion request, the external device 200 may complete the sound measurement.

As described above, when the external device 200 measures the sound generated upon driving of the motor 110 of the electronic device, the electronic device 100 may receive the sound information measured by the external device 200 through the communication device 170. In addition, the signal processing device 160 may obtain the eigenfrequency information of the electronic device 100 upon driving of the motor 110, using the received sound information.

Referring to FIG. 7, the electronic device 100 according to an embodiment may measure the sound generated in the surrounding environment using the external device 200.

Here, the external device 200 may include the microphone and speaker inside, output a preset sound through the speaker, and measure the ambient sound of the external device 200 using the microphone. The external device 200 may be a PC, notebook, smartphone, or the like.

The external device 200 may output a preset sound using a speaker in a state where the external device 200 is located in the vicinity of the electronic device 100. The preset sound is the sound of the electrical signal including the entire frequency band. For example, the sound may be a sound of at least one of impulse signals, white noise, pink noise, maximum length sequence (MLS) signal or a chirp signal, and is not limited thereto.

In addition, the external device 200 may measure the ambient sound of the electronic device 100 using a microphone. To be specific, the microphone of the external device 200 may measure not only the sound output from the speaker and immediately reach the microphone, but also the sound reflected from the surrounding environment of the electronic device 100 after being output from the speaker. At this time, the motor 110 of the electronic device 100 should be in a state of not being driven.

As described above, when the external device 200 measures the ambient sound of the electronic device 100, the electronic device 100 may receive the sound information measured by the external device 200 and the output preset sound information through the communication device 170. In addition, the signal processing device 160 may obtain the eigenfrequency information of the surrounding environment of the electronic device 100 using the received information.

With reference to FIGS. 6 and 7, the sound measurement method using the external device 200 described above may be applied when a microphone or a speaker is not provided in the electronic device. Therefore, even if the electronic device does not measure the ambient sound directly, the electronic device may obtain the eigenfrequency of the electronic device reflecting the influence of the installed environment and the eigenfrequency of the surrounding environment, and operate by avoiding the obtained eigenfrequency. Therefore, vibration and noise may be reduced.

In illustrating and describing FIGS. 6 and 7, it has been described that the signal processing device obtains the eigenfrequency information of the electronic device or the eigenfrequency information of the surrounding environment by using information received from an external device, but in implementation, the processor may perform the above-described operation.

Figure 8:
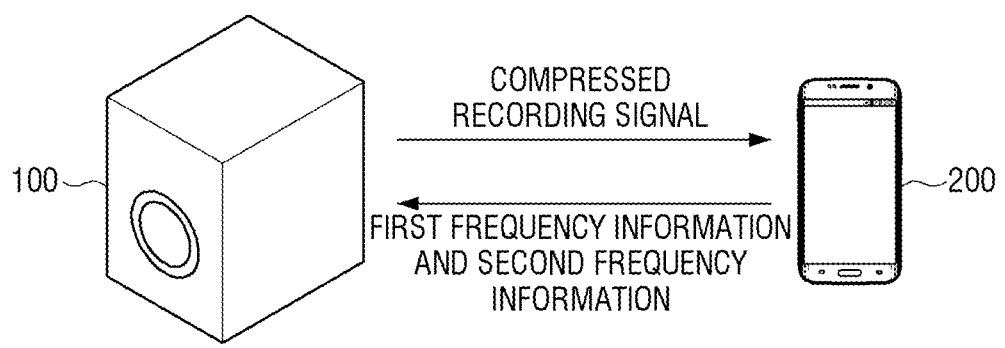
FIG. 8 illustrates a view to describe an operation to obtain frequency information using an external device.

FIG. 8 is a view to describe an operation to obtain frequency information using an external device.

Referring to FIG. 8, the electronic device 100 according to an embodiment may transmit the measured sound to the external device 200, and obtain the frequency information from the external device 200. Here, the external device 200 may be a PC, a notebook, a smartphone, or the like.

First, the electronic device 100 may measure a sound generated upon driving of the motor 110 by using the microphone 140 provided in the electronic device 100. The electronic device 100 may output a preset sound by using the speaker 150 provided in the electronic device 100, and measure the ambient sound of the electronic device 100 by using the microphone 140.

The electronic device 100 may transmit the measured sound information and preset sound information outputted from the speaker 150 to the external device 200 through the communication device 170. Alternatively, the electronic device 100 may compress the measured sound information and the preset sound information, and then transmit the compressed sound information to the external device 200.

The external device 200 may obtain the eigenfrequency information of the electronic device 100 using the sound information generated upon the driving of the motor 110 among the received sound information. Further, the external device 200 may obtain the eigenfrequency information of the surrounding environment using the ambient sound information of the electronic device 100 and the preset sound information of the received sound information.

The external device 200 may transmit the obtained eigenfrequency information of the electronic device 100 and the eigenfrequency information of the surrounding environment to the electronic device 100. The electronic device 100 may update the speed control table by using the received frequency information or select a speed control table corresponding to the received frequency information among the plurality of speed control tables.

In illustrating and describing FIG. 8, it has been illustrated and described that the electronic device measures the sound generated from the electronic device and the sound generated from the surrounding environment, but in implementation, it may be implemented that the sound is measured by the external device as illustrated in FIGS. 6 and 7.

FIGS. 9 to 14 are views to describe a modification method to improve accuracy of a microphone.

In general, in order to reduce vibration and noise, a method measuring frequency related to vibration and noise which occur upon driving of the electronic device using an accelerometer and driving the electronic device by avoiding the measured frequency is applied.

However, the accelerometer has a high installation cost, and when the accelerometer is provided inside, not outside of the electronic device, the accelerometer may not accurately measure frequencies related to vibration and noise generated by the influence of the surrounding environment, including the floor condition in which the electronic device is installed. In this regard, the disclosure proposes a method of obtaining frequency information using a microphone and a speaker in order to solve this problem.

When a microphone is used, the frequency band which may be measured by the microphone is 20 Hz or more, and the measurement accuracy may be different depending on the type of the microphone. In this regard, there is a need to modify the measurement result of the microphone.

As a method of modifying the measurement result of the microphone, it is possible to perform the modification by using an accelerometer having a higher measurement accuracy than the microphone. Hereinafter, a specific method of modifying the measurement result of the microphone by using the accelerometer measurement result and the microphone measurement result will be described.

Figure 9:
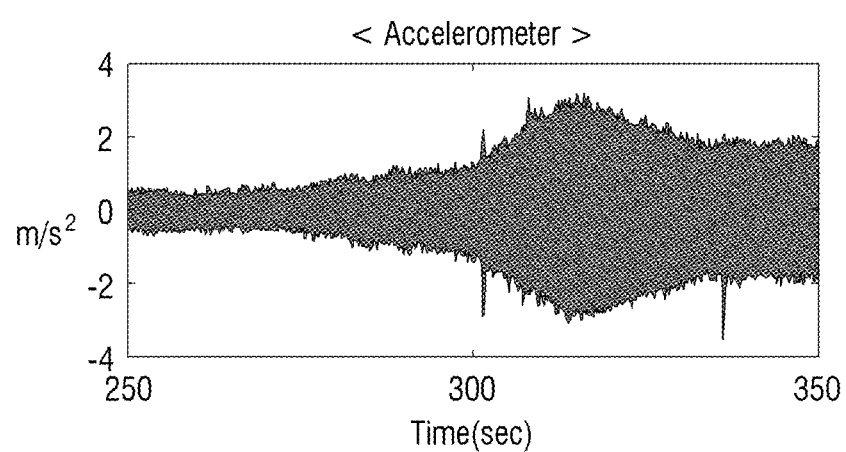
FIG. 9 illustrates a view of an example of a measurement result of an accelerometer.
Figure 10:
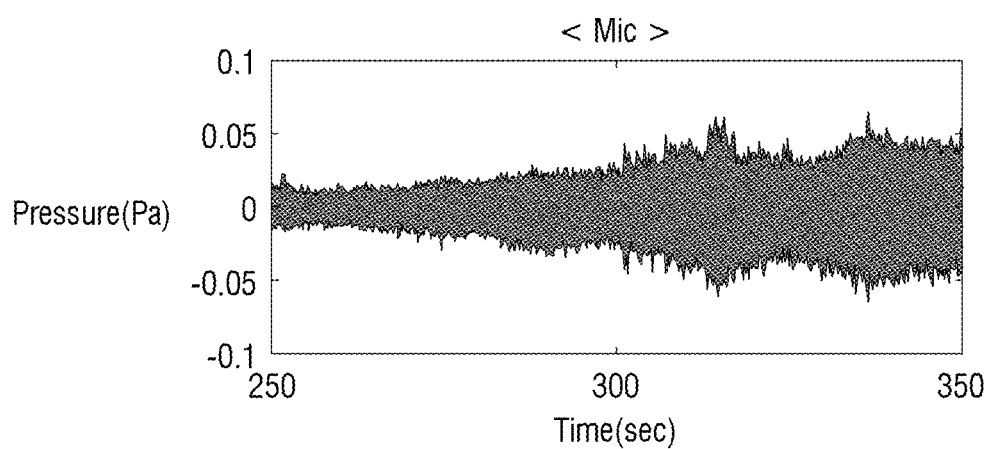
FIG. 10 illustrates a view of an example of a measurement result of a microphone.

FIGS. 9 and 10 are views illustrating an example of a measurement result of an accelerometer and a microphone, respectively.

While the accelerometer is disposed outside the electronic device 100, the motor 110 of the electronic device 100 may be driven. Using the accelerometer and the microphone, acceleration (m/s$^2$) and the sound pressure (Pa) may be measured.

Through the above-process, the acceleration (m/s$^2$) graph according to the measured time may be obtained using the accelerometer as FIG. 9. In addition, as illustrated in FIG. 10, the sound pressure (Pa) graph according to the measured time may be obtained using the microphone.

In illustrating and describing FIGS. 9 and 10, it has been described that the measured sound is a sound that is generated upon driving of the motor of the electronic device, but in implementation, the sound may be a sound of the surrounding environment that is measured in a situation where the electronic device does not operate.

Figure 11:
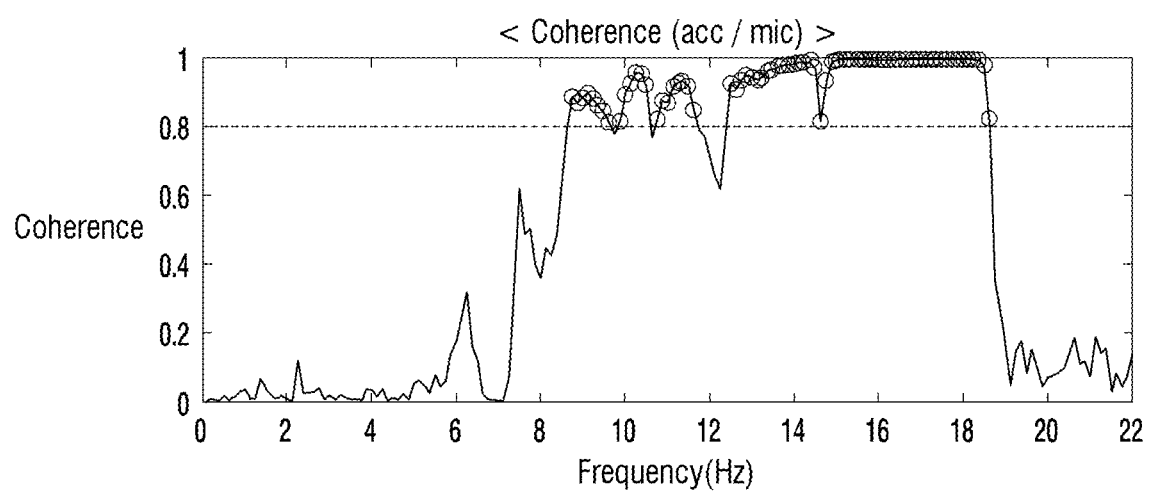
FIG. 11 illustrates a view of an example of coherence of a measurement result of an accelerometer and a measurement result of a microphone.

FIG. 11 is a view illustrating an example of coherence of a measurement result of an accelerometer and a measurement result of a microphone.

The measurement result of FIGS. 9 and 10 may be transformed to the frequency domain. By using the acceleration measurement result transformed to the frequency domain and the sound pressure measurement result, a coherence graph according to the frequency band of both may be calculated.

In the coherence graph according to the calculated frequency band, the greater the coherence size of a specific frequency band, the higher the accuracy of the transfer function estimation of the measurement result of the accelerometer from the measurement result of the microphone in the corresponding frequency band. That is, in the case of a frequency band having a large size of coherence, it means that the result modified from the measurement result of the microphone is reliable.

Therefore, in the coherence graph according to the calculated frequency band, the frequency band having coherence that is greater than or equal to the preset size may be identified. Here, the preset size means the size from which the modified result from the measurement result of the microphone may be reliable, and the size may be determined according to the result of the repetitive experiment result.

For example, in FIG. 11, the preset size is 0.8, and the frequency band having the coherence size that is greater than or equal to the preset size is the band marked in circle. The band is in a range about 9 Hz to 11 Hz and 12.5 Hz to 18.5 Hz.

As described above, the frequency band having the coherence size equal to or greater than the predetermined size, that is, the frequency band which is determined to be reliable in the modified result, may be identified, and the modification for the identified frequency band only may be performed. In the case of low similarity frequency band, even if the modification is performed, there may be a big difference from the value measured using the actual accelerometer. Therefore, modification of the corresponding frequency band may not be performed.

Figure 12:
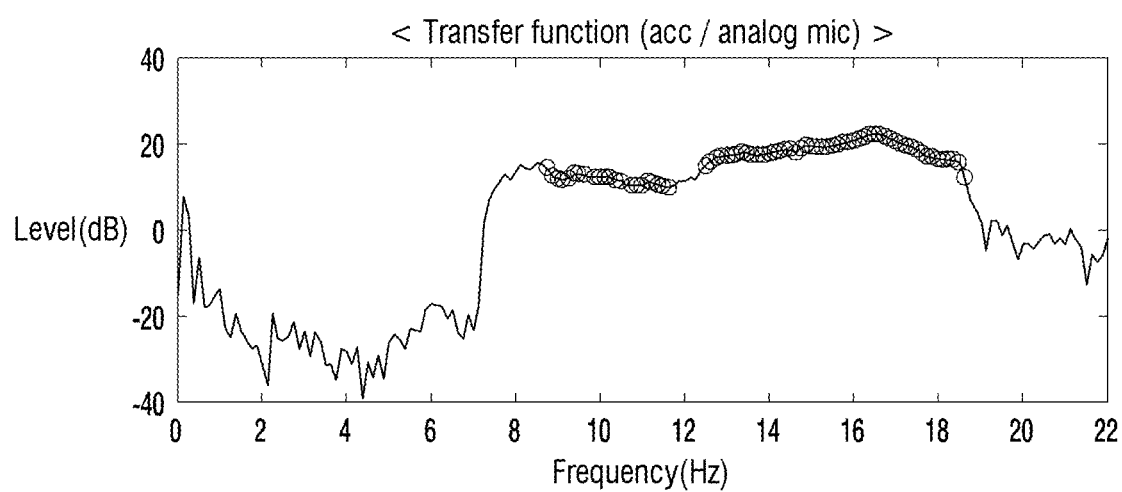
FIG. 12 illustrates a view of an example of a transfer function of a measurement result of an accelerometer and a measurement result of a microphone.

FIG. 12 is a view illustrating an example of a transfer function of a measurement result of an accelerometer and a measurement result of a microphone.

The measurement results of FIG. 9 and FIG. 10 described above may be transformed to a frequency domain. The transfer function may be calculated using the measured result transformed to the frequency domain. Specifically, the transfer function (=Y/X) may be calculated by dividing the acceleration measurement result (=Y) transformed to the frequency domain by the sound pressure measurement result (=X) transformed to the frequency domain.

It is possible to identify the transfer function value corresponding to the frequency band having a coherence size that is greater than or equal to the preset size as in FIG. 11 of the calculated transfer function. For example, in relation to FIG. 11 described above, the frequency band where the size of the coherence is 0.8 or more is about 9 Hz to 11 Hz and 12.5 Hz to 18.5 Hz, so that in the transfer function graph of FIG. 12, the transfer function value corresponding to the frequency band of about 9 Hz to 11 Hz and 12.5 Hz to 18.5 Hz may be identified.

The frequency band in which the size of coherence is large and the corresponding transfer function value are used to modify the sound information upon driving of the motor 110 of the electronic device 100 that is measured through the microphone, thereafter.

Specifically, the modification may be performed by transforming the sound information (=x') generated upon driving of the motor 110 measured by the microphone 140 to the frequency domain (x→X), and then, among the transformed sound information (=X), multiplying the frequency component corresponding to the frequency band of which coherence size is large by the transfer function (=Y/X). In addition, it is highly likely that the real microphone may not correctly measure the areas other than the frequency band of which the coherence size is large and thus, the areas may not be used.

Figure 13:
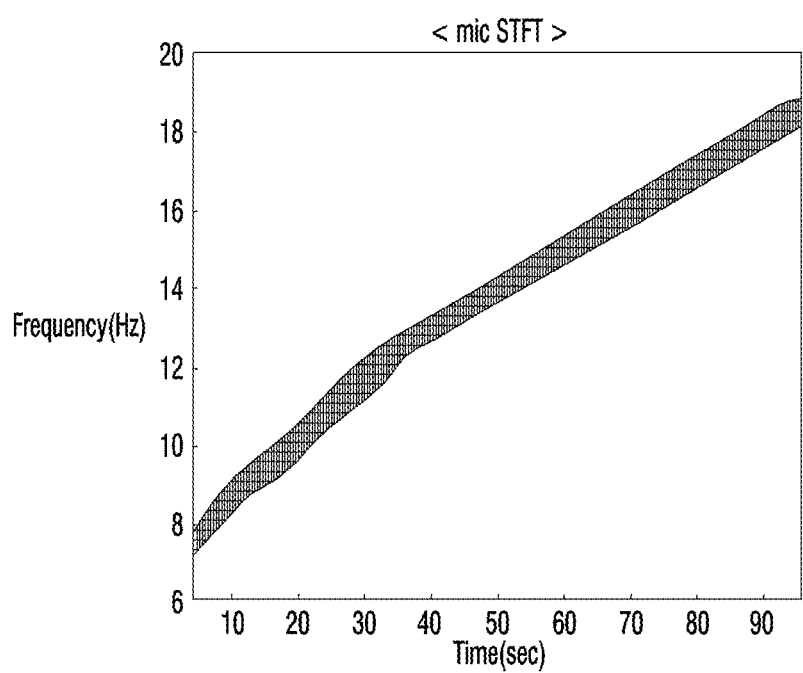
FIG. 13 illustrates a view of an example of a modified measurement result of a frequency spectrum of a microphone.
Figure 14:
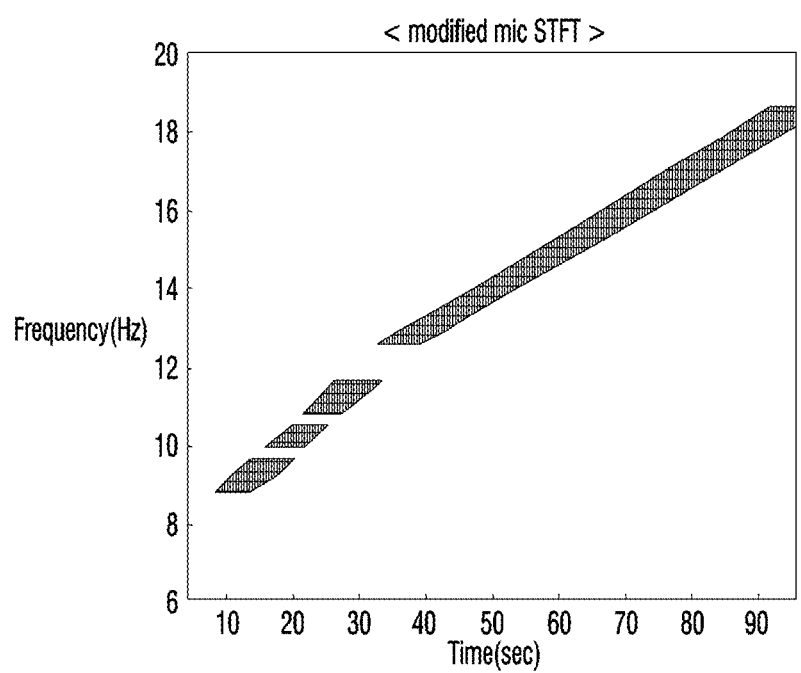
FIG. 14 illustrates a view of an example of a frequency spectrum of a modified measurement result of a microphone.

FIGS. 13 and 14 are views illustrating an example of a measurement result of a frequency spectrum of a microphone according to modification or non-modification.

Referring to FIG. 13, the time-specific frequency spectrum calculated through the STFT of the sound information generated upon driving of the motor 110 measured by the microphone 140 may be identified. This corresponds to the time-specific frequency spectrum before the modification is performed.

In addition, the transfer function may be multiplied by a frequency component corresponding to a frequency band having a high similarity among the time-specific frequency spectrums calculated as described above with reference to FIG. 12. Referring to FIG. 14, it is possible to identify a time-specific frequency spectrum in which modification is performed. At this time, it may be identified that the region other than the frequency band of high similarity is removed.

In the case of obtaining frequency information of the electronic device using the time-specific frequency spectrum which has been modified as described above, the eigenfrequency information having higher accuracy than that of acquiring frequency information by using the time-specific frequency spectrum without modification may be obtained.

Figure 15:
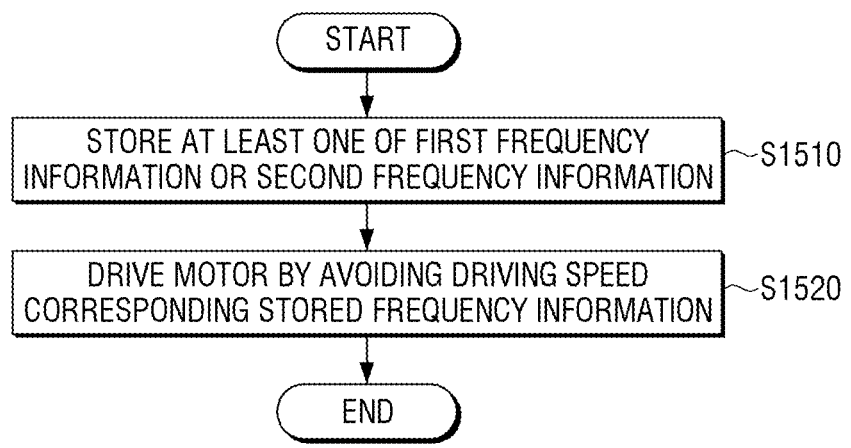
FIG. 15 illustrates a flowchart to describe a controlling method of an electronic device according to an embodiment.

FIG. 15 is a flowchart to describe a controlling method of an electronic device according to an embodiment.

Referring to FIG. 15, the first frequency information for the sound generated upon driving of the motor or the second frequency information for the surrounding environment of the electronic device is stored in step S1510.

At this time, the first frequency information or the second frequency information may be obtained by using the sound information measured by using the microphone and speaker provided in the electronic device.

First of all, the first frequency information may be obtained from the sound information that is obtained by measuring the sound generated during driving of the motor of the electronic device through the microphone.

To be specific, the motor may be driven at a preset speed range, and the ambient sound of the electronic device may be measured by using a microphone while the motor is being driven. The frequency spectrum may be calculated using sound information corresponding to the time when the noise is the greatest among the measured sounds, that is, the time having the maximum power. A frequency band having the largest value may be obtained as first frequency information from the calculated frequency spectrum. The obtained first frequency information may be stored in a memory.

The second frequency information may be obtained from the sound information which is obtained by measuring the sound of the surrounding environment of the electronic device by the microphone in a state where the motor of the electronic device is not driven.

Specifically, a speaker may be used to output a preset sound and a microphone may be used to measure the ambient sound of the electronic device. Here, the preset sound is the sound of the electrical signal including the full frequency band. For example, the sound may be at least one signal among impulse signals, white noise, pink noise, MLS, or chirp signal, but is not limited thereto.

By comparing the measured sound information and the output sound information, the second frequency information may be obtained. The obtained second frequency information may be stored in the memory.

The aforementioned first frequency information or the second frequency information may be received from the external device. The received first frequency information or the second frequency information may be stored in the memory.

The motor is controlled to be driven such that the driving speed corresponding to the stored frequency information is avoided in step S1520.

Specifically, the motor may be driven to operate at a driving speed other than a speed range corresponding to the eigenfrequency information of the electronic device or the eigenfrequency information of the surrounding environment. For example, the motor may be driven to operate at a speed that is less than or greater than a driving speed corresponding to the frequency information.

The motor may be driven to such that the driving time at a speed range corresponding to the eigenfrequency of the electronic device or the eigenfrequency of the surrounding environment is minimized.

The motor may be driven to operate by avoiding the driving speed corresponding to the eigenfrequency information of the electronic device included in the frequency information or the base frequency having the harmonics which are the same frequency as the eigenfrequency information of the surrounding environment.

The prestored speed control table of the motor may be updated to avoid the driving speed corresponding to a base frequency having a frequency equal to the eigenfrequency or a base frequency having harmonics which is the same frequency band as the eigenfrequency. The update operation may be performed when a preset event occurs.

Here, the preset event may be an event in which the electronic device 100 is installed first, an even in which a preset cycle of the electronic device 100 is reached, an event in which an update command is received from the user, or a case where a change in the surrounding environment is sensed through a sensor, or the like.

The motor may be controlled by using the updated speed control table.

Therefore, the controlling method of the electronic device may obtain the eigenfrequency information of the electronic device and the eigenfrequency information of the surrounding environment according to an impact of a place where the electronic device is installed, and thus, by avoiding the eigenfrequency of the electronic device reflecting the impact of the environment and the eigenfrequency of the surrounding environment, there is an effect of reducing vibration and noise. The controlling method as shown in FIG. 15 may be executed by the electronic device having the configuration of FIG. 1 or FIG. 2, or by any other electronic device having another configuration.

In addition, the controlling method as described above may be implemented as at least one execution program for executing the controlling method as described above, and the execution program may be stored in a non-transitory computer readable medium.

Non-transitory readable medium means a medium that stores data for a short period of time such as a register, a cache, and a memory, but semi-permanently stores data and is readable by the apparatus. In particular, the various applications or programs described above may be stored and provided on non-volatile readable media such as CD, DVD, hard disk, Blu-ray disk, USB, memory card, ROM.

Figure 16:
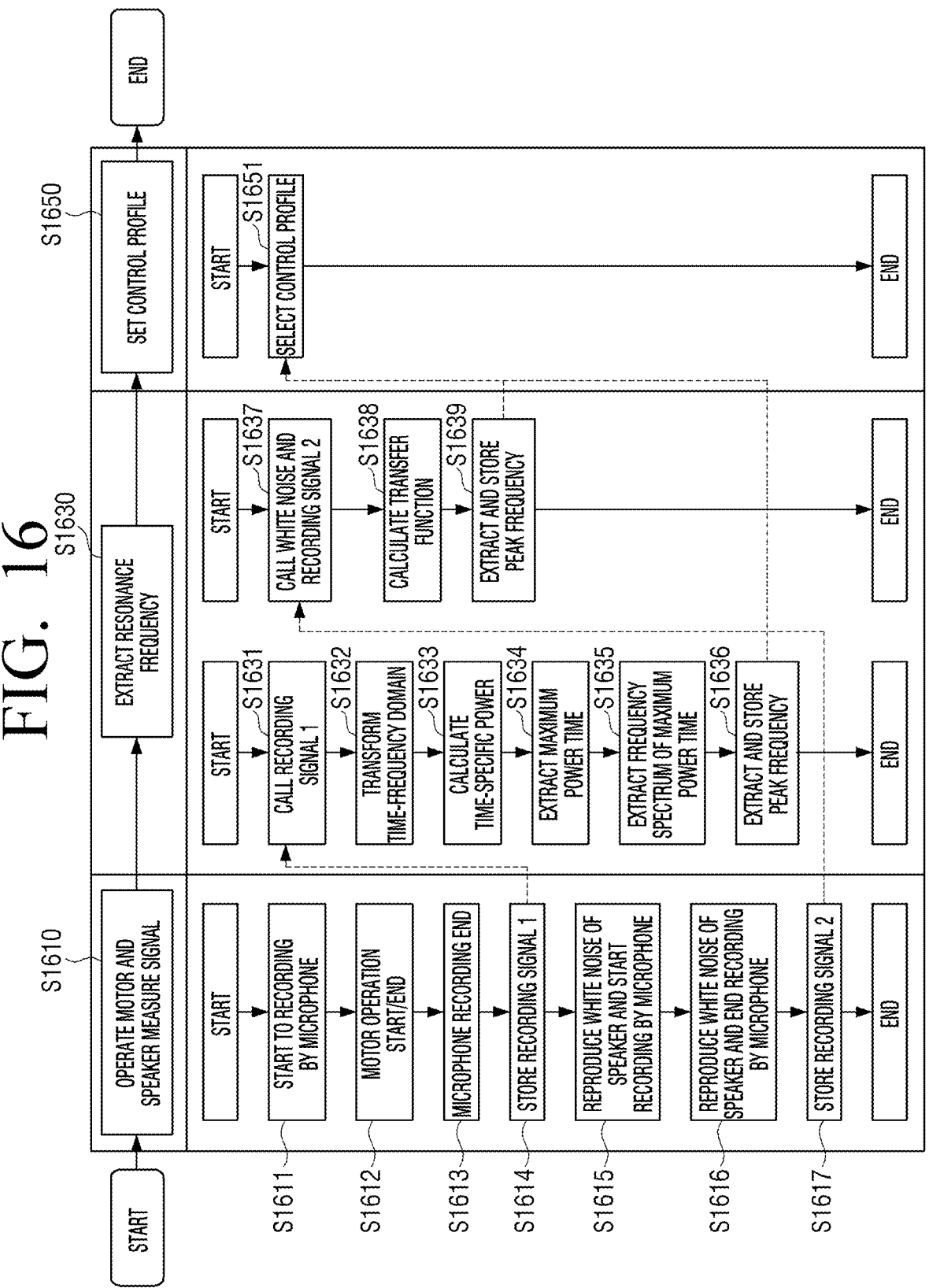
FIG. 16 illustrates a flowchart to describe a specific controlling method of an electronic device according to an embodiment.

FIG. 16 is a flowchart to describe a specific controlling method of an electronic device according to an embodiment.

The sound generated upon operating of the electronic device and the sound of the surrounding environment of the electronic device may be measured in step S1610.

In the case of sound generated during operation of the electronic device, the sound may be measured using a microphone. When the measurement and recording is started by using the microphone in step S1611, it may be controlled such that the motor is driven at a predetermined speed range, and then the driving of the motor may be stopped again after sufficient time elapsed in step S1612. After the measurement using the microphone is completed in step S1613, the measured sound may be stored as recording signal 1 in step S1614.

The sound of the surrounding environment of the electronic device may be measured using the microphone and the speaker. Here, the measurement is performed while the motor of the electronic device is not being driven.

The white noise may be output using the speaker, and the ambient sound may be measured using the microphone in step S1615. After sufficient time elapses, the output of the speaker is stopped, and after the measurement using the microphone is completed in step S1616, the measured sound may be stored as recording signal 2 in step S1617.

The eigenfrequency information of the electronic device and the eigenfrequency information of the surrounding environment may be obtained using the measured sound information in step S1630.

To be specific, first, the stored recording signal 1 may be called in step S1631. The frequency spectrum may be calculated by transforming the called recording signal 1 from the time domain to the frequency domain in step S1632. In this case, the STFT may be performed to transform to the frequency domain, and the method of transforming to the frequency domain is not limited thereto.

From the calculated frequency spectrum, the time-specific power change graph may be calculated again in step S1633, and the time having the maximum power may be derived therefrom in step S1634. In addition, a power spectrum density graph may be calculated using the derived time information and the frequency spectrum having the maximum power in step S1635.

The frequency band having the maximum sound pressure level may be identified from the calculated power spectrum density graph, and the identified frequency band may be stored as the eigenfrequency information of the electronic device in step S1635.

The stored recording signal 2 may be called in step S1637. The transfer function may be calculated in step S1638. The recording signal 2 and the white noise signal in step S1638. Specifically, when the information which is obtained by transforming the recording signal 2 into the frequency domain is Y and the information which is obtained by transforming the white noise signal into the frequency domain is X, the transfer function may be calculated as Y/X.

From the calculated transfer function, the frequency band which reaches the peak may be identified. At this time, the frequency band which reaches the peak may be stored as the eigenfrequency information of the surrounding environment of the electronic device in step S1639.

In addition, the speed control table may be set using the acquired eigenfrequency information in step S1650. To be specific, when a plurality of speed control tables is stored, a speed control table corresponding to the acquired eigenfrequency information may be selected. Alternatively, when the default speed control table is stored, the speed control table may be updated using the acquired eigenfrequency information.

In illustrating and describing FIG. 16, it has been illustrated and described that recording signal 1 is measured first and then recording signal 2 is measured, but in implementation, recording signal 2 may be measured first and then recording signal 1 may be measured.

In illustrating and describing FIG. 16, it has been illustrated and described that the speaker outputs white noise, but in implementation, the sound output by the speaker is not limited to the above-described example, and it may be implemented that other noise such as pink noise is output.

Accordingly, the controlling method of the electronic device may acquire the eigenfrequency information of the electronic device and the eigenfrequency information of the surrounding environment according to the influence of the place where the electronic device is installed, and the electronic device may operate by avoiding the eigenfrequency of the electronic device and the eigenfrequency of the surrounding environment of the electronic device to which the impact of the surrounding environment is reflected, there is an effect of reducing vibration and noise. The controlling method as shown in FIG. 16 may be executed on the electronic device having the configuration of FIG. 1 or 2 and may also be executed on an electronic device having another configuration.

The above controlling method may be implemented as at least one execution program to execute the controlling method as described above, and the execution program may be stored in a non-transitory readable medium.

FIG. 17 is a sequence diagram to describe a method for selecting a control table using an external device according to a first embodiment.

First of all, the electronic device 100 may measure the sound upon driving of a motor using a microphone and store the measured sound as recording signal 1 in step S1710.

Then, the electronic device 100 may measure the ambient sound while not driving the motor in step S1720. To be specific, the electronic device 100 may output white noise using a speaker inside the electronic device 100 and measure sound of the surrounding environment of the electronic device 100 using a microphone.

The electronic device 100 may compress the measured recording signal 1, the recording signal 2, and the white noise information of the electronic d step S1730, and transmit the compressed recording signal to the external device 200 in step S1735. In this case, the external device 200 may be a PC, a notebook, a smartphone, or a server. In addition, when compressing a recording signal, the sampling frequency may be limited to a low frequency band of about 100 to 200 Hz to prevent invasion of the privacy of the user of the electronic device 100.

In step S1740, the external device 200 may acquire recording signal 1 from the compressed recording signal. In step S1750, first frequency information, which is eigenfrequency information of the electronic device 100, may be generated using the obtained recording signal 1. Since the method for acquiring the eigenfrequency information of the electronic device 100 has been described in detail above with respect to the operation of the processor, redundant description thereof will be omitted.

In addition, the external device 200 may obtain recording signal 2 and the white noise information from the compressed recording signal in step S1760. In step S1770, second frequency information, that is, eigenfrequency information of the surrounding environment of the electronic device 100, may be generated using the obtained recording signal 2 and the white noise. The method of acquiring the eigenfrequency information of the surrounding environment has been described in detail above with respect to the operation of the processor, and redundant description will be omitted.

The external device 200 may transmit the generated first frequency information and the second frequency information back to the electronic device 100 in step S1775. The electronic device 100 may select a speed control table using the received frequency information in step S1780.

Meanwhile, in illustrating and describing FIG. 17, it has been described and illustrated that recording signal 1 is measured first and then recording signal 2 is measured. However, in the implementation, recording signal 2 may be measured first, and then recording signal 1 may be measured.

In illustrating and describing FIG. 17, it has been illustrated and described that first frequency information is generated first and then the second frequency information is obtained, but in implementation, the second frequency information may be obtained first and then the first frequency information may be obtained.

In illustrating and describing FIG. 17, it has been illustrated and described that the speaker outputs white noise, but in implementation, the sound output by the speaker is not limited to the above-described example, and it may be implemented that other noise such as pink noise is output.

In illustrating and describing FIG. 17, it has been illustrated and described that the electronic device selects the speed control table, but in implementation, the electronic device may update the default speed control table using the eigenfrequency information.

In illustrating and describing FIG. 17, it has been illustrated and described that the electronic device selects the speed control table, but in implementation, the external device may select the speed control table using the eigenfrequency information related to the electronic device.

Therefore, the controlling method of the electronic device may obtain the eigenfrequency information related to the electronic device by using the external device, and thus has an effect of reducing the amount of computation performed in the electronic device. The controlling method as shown in FIG. 17 may be executed on an electronic device having the configuration of FIG. 1 or 2 and may also be executed on an electronic device having another configuration.

In addition, the controlling method as described above may be implemented with at least one execution program for executing the controlling method as described above, and the execution program may be stored in a non-transitory readable medium.

FIG. 18 is a sequence diagram to describe a method for selecting a control table using an external device according to a second embodiment.

The electronic device 100 may drive a motor in step S1810-1, and transmit a signal for requesting sound measurement to the external device 200 in step S1815. At this time, the external device 200 may be a PC, a notebook, a smartphone, or a server including a microphone and a speaker.

The external device 200 may measure a sound generated upon n driving of the motor of the electronic device 100 by using a microphone according to the received sound measurement request signal, and store the measured sound as recording signal 1 in step S1820. In this case, the external device 200 may perform the measurement in a state of being disposed on the top of the electronic device 100 or in a state of being located in the vicinity of the electronic device 100 for the accuracy of the measurement.

When a sufficient time elapses, the external device 20 may complete measurement of the microphone and may transmit the sound measurement completion signal to the electronic device 100 again in step S1825. The electronic device 100 may stop driving of the motor according to the received sound measurement completion signal in step S1810-2.

The external device 200 may output the white noise using the speaker, measure the ambient sound of the external device 200 using the microphone, and store the measured sound as recording signal 2 in step S1830.

The external device 200 may compress the measured recording signal 1, recording signal 2, and white noise information in step S1840, and transmit the compressed recording signal to the electronic device 100 in step S1845.

The electronic device 100 may obtain recording signal 1 from the compressed recording signal in step S1850. In operation S1860, first frequency information, that is, eigenfrequency information of the electronic device 100, may be generated using the obtained recording signal 1. Since the method for acquiring the eigenfrequency information of the electronic device 100 has been described in detail above with respect to the operation of the processor, redundant description thereof will be omitted.

In operation S1870, the electronic device 100 may obtain recording signal 2 and the white noise information from the compressed recording signal. In operation S1880, second frequency information that is eigenfrequency information of the surrounding environment of the electronic device 100 may be generated using the obtained recording signal 2 and the white noise. Since the method of acquiring the eigenfrequency information of the surrounding environment has been described in detail above with respect to the operation of the processor, redundant description thereof will be omitted.

The electronic device 100 may select the speed control table corresponding to the obtained frequency information in step S1890.

Meanwhile, in illustrating and describing FIG. 18, it has been described and illustrated that recording signal 1 is measured first and then recording signal 2 is measured. However, in the implementation, recording signal 2 may be measured first, and then recording signal 1 may be measured.

In illustrating and describing FIG. 18, it has been illustrated and described that first frequency information is generated first and then the second frequency information is obtained, but in implementation, the second frequency information may be obtained first and then the first frequency information may be obtained.

In illustrating and describing FIG. 18, it has been illustrated and described that the speaker outputs white noise, but in implementation, the sound output by the speaker is not limited to the above-described example, and it may be implemented that other noise such as pink noise is output.

In illustrating and describing FIG. 18, it has been illustrated and described that the electronic device selects the speed control table, but in implementation, the electronic device may update the default speed control table using the eigenfrequency information.

Therefore, the controlling method of the electronic device of the disclosure may measure the sound generated upon driving of the motor of the electronic device by the external device and the ambient sound of the electronic device. Therefore, when the electronic device is not equipped with a microphone and a speaker, there is an effect of obtaining an eigenfrequency related to the electronic device. The controlling method as shown in FIG. 18 may be executed on an electronic device having the configuration of FIG. 1 or 2, or may be executed on an electronic device having another configuration.

In addition, the controlling method as described above may be implemented with at least one execution program for executing the controlling method as described above, and the execution program may be stored in a non-transitory readable medium.

FIG. 19 is a sequence diagram to describe a method for selecting a control table using an external device according to a third embodiment.

First, the electronic device 100 may drive the motor in step S1910-1, and request a signal for requesting sound measurement to the external device 200 in step S1915. At this time, the external device 200 may be a PC including a microphone and a speaker, a notebook, a smartphone, or a server.

The external device 200 may measure a sound generated upon driving of the electronic device 100 using a microphone according to the received sound measurement request signal, and store the measured sound as recording signal 1 in step S1920. In this case, the external device 200 may perform the measurement in a state of being disposed on an upper portion of the electronic device 100 or in a state of being disposed around the electronic device 100 for the accuracy of the measurement result.

The external device 200 may complete the measurement of the microphone after sufficient time elapses, and may transmit a sound measurement completion signal to the electronic device 100 again in step S1925. The electronic device 100 may stop the driving of the motor according to the received sound measurement completion signal in step S1910-2.

The external device 200 may output white noise using the speaker, measure the ambient noise of the external device 200 using the microphone, and store the measured sound as recording signal 2 in step S1930.

In addition, after the external device 200 reads out recording signal 1 in step S1940, the external device 200 may generate first frequency information that is the eigenfrequency information of the electronic device 100 using recording signal 1 in step S1950. Since the method for acquiring the eigenfrequency information of the external device 200 has been described in detail above with respect to the operation of the processor, redundant description thereof will be omitted.

After the external device 200 reads out recording signal 2 and the white noise information in step S1960, the external device 200 may generate the second frequency information that is eigenfrequency information of the surrounding environment of the electronic device 100 using recording signal 2 and the white noise in step S1970. Since the method of acquiring the eigenfrequency information of the surrounding environment has been described in detail above with respect to the operation of the processor, redundant description thereof will be omitted.

The external device 200 may transmit the obtained first frequency information and the second frequency information to the electronic device 100 in step S1975. The electronic device 100 may select the speed control table according thereto, using the received frequency information in step S1980.

Meanwhile, in illustrating and describing FIG. 19, it has been described and illustrated that recording signal 1 is measured first and then recording signal 2 is measured. However, in the implementation, recording signal 2 may be measured first, and then recording signal 1 may be measured.

In illustrating and describing FIG. 19, it has been illustrated and described that first frequency information is generated first and then the second frequency information is obtained, but in implementation, the second frequency information may be obtained first and then the first frequency information may be obtained.

In illustrating and describing FIG. 19, it has been illustrated and described that the speaker outputs white noise, but in implementation, the sound output by the speaker is not limited to the above-described example, and it may be implemented that other noise such as pink noise is output.

In illustrating and describing FIG. 19, it has been illustrated and described that the electronic device selects the speed control table, but in implementation, the electronic device may update the default speed control table using the eigenfrequency information.

In illustrating and describing FIG. 19, it has been illustrated and described that the electronic device selects the speed control table, but in implementation, the external device may select the speed control table using the eigenfrequency information related to the electronic device.

Accordingly, the controlling method of the electronic device of the disclosure may measure the sound generated upon driving of the motor of the electronic device by the external device and the ambient sound of the electronic device, and obtain eigenfrequency information related to the electronic device therefrom. Therefore, even when the electronic device is not provided with a microphone and a speaker, there is an effect of obtaining eigenfrequency associated with the electronic device. The controlling method as shown in FIG. 19 may be executed on an electronic device having the configuration of FIG. 1 or 2, or may be executed on an electronic device having another configuration.

The controlling method described above may be implemented as at least one execution program to execute the aforementioned controlling method, and the execution program may be stored in a non-transitory readable medium.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a motor;
memory configured to store a speed control table corresponding to a preset function and to at least one of first frequency information associated with a sound that is generated when the motor is driven or second frequency information associated with a surrounding environment of the electronic device; and
a processor configured to:
control the motor to be driven by avoiding a driving speed corresponding to the frequency information stored in the memory,
update the speed control table to avoid the driving speed corresponding to a frequency included in the stored frequency information, and
control the motor to use the updated speed control table when the preset function is executed.

2. The electronic device of claim 1, wherein the processor further configured to control the motor to operate at a driving speed other than a speed range corresponding to a frequency included in the stored frequency information, or minimize a driving time in the speed range.

3. The electronic device of claim 1, wherein the processor is further configured to control the motor to operate based on a driving speed corresponding to a frequency included in the stored frequency information or harmonics frequencies of a base frequency, the harmonic frequencies determined in a frequency band that is identical with the frequency.

4. The electronic device of claim 1, wherein the processor is further configured to update the speed control table that is stored in the memory based on at least one of an event in which the electronic device is initially installed, an event in which a preset cycle is reached, or an event in which an update command is input.

5. The electronic device of claim 1, further comprising:
a microphone configured to obtain sound information,
wherein the processor is further configured to:
control the motor to drive at a preset speed range;
measure the sound information through the microphone while driving the motor; and
generate the first frequency information using a frequency spectrum of the sound information corresponding to a time instance in which the measured sound information indicates a noise louder than other time instances.

6. The electronic device of claim 5, wherein the processor is further configured to store the sound information comprising a value larger than other values in the frequency spectrum as the first frequency information in the memory.

7. The electronic device of claim 1, further comprising:
a speaker configured to output a preset sound; and
a microphone configured to obtain sound information,
wherein the processor is further configured to:
control the speaker to output a preset sound,
measure the sound information through the microphone while outputting the sound of the speaker is being output, and
generate the second frequency information based on a comparison between the measured sound information and the preset sound.

8. The electronic device of claim 7, wherein the preset sound comprises at least one of an impulse sound, a white noise sound, a pink noise sound, a maximum length sequence (MLS) sound, or a chirp sound.

9. The electronic device of claim 1, further comprising:
a communication circuit configured to receive, from an external device, at least one of the first frequency information or the second frequency information,
wherein the processor is further configured to store the received frequency information to the memory.

10. A controlling method an electronic device including a motor, the method comprising:
storing a speed control table corresponding to a preset function and to store and at least one of first frequency information associated with a sound that is generated when the motor is driven or second frequency information associated with a surrounding environment of the electronic device;
driving the motor by avoiding a driving speed corresponding to the stored frequency information;
updating the speed control table to avoid the driving speed corresponding to a frequency included in the stored frequency information; and
using the updated speed control table when a preset function is executed.

11. The controlling method of claim 10, further comprising operating at a driving speed other than a speed range corresponding to a frequency included in the stored frequency information or minimizing a driving time in the speed range.

12. The controlling method of claim 10, further comprising operating based on a driving speed corresponding to a frequency included in the stored frequency information or a harmonics frequencies of a base frequency, the harmonic frequencies determined in a frequency band that is identical with the frequency.

13. The controlling method of claim 10, further comprising updating the speed control table that is stored in memory based on at least one of an event in which the electronic device is initially installed, an event in which a preset cycle is reached, or an event in which an update command is input.

14. The controlling method of claim 10, further comprising:
obtaining sound information through a microphone;
driving at a preset speed range;
measuring the sound information through the microphone while driving the motor; and
generating the first frequency information using a frequency spectrum of the sound information corresponding to a time instance in which the measured sound information indicates a noise louder than other time instances.

15. The controlling method of claim 14, further comprising storing the sound information comprising a value larger than other values in the frequency spectrum as the first frequency information.

16. The controlling method of claim 10, further comprising:
outputting a preset sound;
obtaining sound information;
measuring sound information while outputting the preset sound; and
generating the second frequency information based on a comparison between the measured sound information and the preset sound.

17. The controlling method of claim 16, wherein the preset sound comprises at least one of an impulse sound, a white noise sound, a pink noise sound, a maximum length sequence (MLS) sound, or a chirp sound.

18. The controlling method of claim 10, further comprising:
receiving, from an external device, at least one of the first frequency information or the second frequency information, and
storing the received frequency information to memory.

* * * * *